(12) United States Patent
Tervo et al.

(10) Patent No.: US 10,061,124 B2
(45) Date of Patent: Aug. 28, 2018

(54) ROBUST ARCHITECTURE FOR LARGE FIELD OF VIEW COMPONENTS

(71) Applicant: MICROSOFT TECHNOLOGY LICENSING, LLC, Redmond, WA (US)

(72) Inventors: Jani Kari Tapio Tervo, Espoo (FI); Tuomas Heikki Vallius, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 15/142,348

(22) Filed: Apr. 29, 2016

(65) Prior Publication Data

US 2017/0315346 A1    Nov. 2, 2017

(51) Int. Cl.
*G02B 27/00* (2006.01)
*G02B 5/18* (2006.01)
(Continued)

(52) U.S. Cl.
CPC ....... *G02B 27/0081* (2013.01); *G02B 5/1819* (2013.01); *G02B 5/1842* (2013.01);
(Continued)

(58) Field of Classification Search
CPC G02B 27/0081; G02B 5/1819; G02B 5/1842; G02B 27/0172; G02B 27/4211;
(Continued)

(56) References Cited

U.S. PATENT DOCUMENTS 5,805,751 A    9/1998  Kewitsch et al.
6,553,162 B1   4/2003  Okayama
(Continued)

FOREIGN PATENT DOCUMENTS

GB    2529003       2/2016
WO    2007141588   12/2007
(Continued)

OTHER PUBLICATIONS

Saleh et al. "Fundamentals of Photonics" p. 60, 1991.*
(Continued)

*Primary Examiner* — Zachary Wilkes
*Assistant Examiner* — George G King
(74) *Attorney, Agent, or Firm* — Workman Nydegger

(57) ABSTRACT

A diffractive beam expander for use in an augmented-reality display is disclosed. The device can include a optical substrate with a first diffractive optical element having a first diffractive grating disposed on one surface and a second diffractive grating disposed on the opposing surface. Portions of the first and second diffractive gratings overlap to define an in-coupling area configured to receive a beam of incoming light. The first diffractive optical element expands at least part of the received light beam by odd-order diffraction expansion in a first region and a second region and expands at least part of the received light beam by even-order diffraction expansion in a third region. The light components by the first diffractive optical element are then coupled into a second diffractive optical element, which is configured to out-couple at least part of the expanded diffracted light components to exit the substrate by diffraction.

18 Claims, 6 Drawing Sheets

(51) Int. Cl.
*G02B 27/01* (2006.01)
*G02B 27/42* (2006.01)

(52) U.S. Cl.
CPC ..... *G02B 27/0172* (2013.01); *G02B 27/4205* (2013.01); *G02B 27/4211* (2013.01); *G02B 27/4272* (2013.01); *G02B 2027/0116* (2013.01); *G02B 2027/0118* (2013.01); *G02B 2027/0125* (2013.01)

(58) Field of Classification Search
CPC ........ G02B 27/4272; G02B 2027/0116; G02B 2027/0118; G02B 2027/0125
USPC ........................................................ 359/567
See application file for complete search history.

(56) References Cited

U.S. PATENT DOCUMENTS

| | | | |
|---|---|---|---|
| 6,580,529 B1* | 6/2003 | Amitai | G02B 5/32 |
| | | | 359/13 |
| 7,483,604 B2 | 1/2009 | Levola | |
| 8,160,411 B2 | 4/2012 | Levola et al. | |
| 8,233,204 B1 | 7/2012 | Robbins et al. | |
| 8,320,032 B2 | 11/2012 | Levola | |
| 8,508,848 B2 | 8/2013 | Saarikko | |
| 8,593,734 B2 | 11/2013 | Laakkonen | |
| 8,654,420 B2 | 2/2014 | Simmonds | |
| 8,989,535 B2 | 3/2015 | Robbins | |
| 9,164,290 B2 | 10/2015 | Robbins et al. | |
| 2009/0303599 A1 | 12/2009 | Levola | |
| 2010/0214659 A1* | 8/2010 | Levola | G02B 5/1814 |
| | | | 359/566 |
| 2013/0250430 A1 | 9/2013 | Robbins et al. | |
| 2014/0300966 A1 | 10/2014 | Travers et al. | |
| 2015/0260994 A1* | 9/2015 | Akutsu | G02B 6/34 |
| | | | 359/567 |
| 2016/0238772 A1* | 8/2016 | Waldern | G02B 5/32 |

FOREIGN PATENT DOCUMENTS

| | | |
|---|---|---|
| WO | 2008038058 | 4/2008 |
| WO | 2008081070 | 7/2008 |
| WO | 2014091204 A1 | 6/2014 |

OTHER PUBLICATIONS

Shariv et al. Compact holographic beam expander, Optics Letters, vol. 18, No. 15, pp. 1268-1270, 1993.*
"International Search Report and the Written Opinion" issued in PCT Application No. PCT/US2017/028234 dated Aug. 16, 2017.
Han, et al: "Portable Waveguide Display System with a Large Field of View by Integrating Freeform Elements and Volume Holograms", in Optics Express, vol. 23, Issue 3, Feb. 9, 2015, 16 pages.

* cited by examiner

ROBUST ARCHITECTURE FOR LARGE FIELD OF VIEW COMPONENTS

BACKGROUND

Background and Relevant Art

This application relates to augmented-reality displays and, more particularly, to improved devices and methods for expanding light beams by diffractive elements for use in augmented-reality displays.

Display modules are used in portable devices to display information in graphical form. Small size is an important aspect in portable devices. However, the small size of a portable device also sets a limitation to the size of a display incorporated in said device. A typical drawback of a conventional small display is the limited field of view. Typically, an observer can examine only a small portion of a large displayed image at a glance, while preserving adequate resolution.

Large images may be displayed by a small device e.g. when the device comprises a near-eye virtual display. Imaging optics may convert a small real image generated by a micro-display into a virtual image. An observer may place the device near his eye such that when light provided by the imaging optics impinges on his eye, he perceives an impression of a large detailed virtual image displayed at an infinite distance.

The micro-display and the imaging optics may be made even smaller and/or lighter weight when the light beam provided by the imaging optics is expanded by using a diffractive beam expander, which is also known as an exit pupil expander (EPE).

In some cases, diffractive beam expanders found in the prior art utilize complex diffraction gratings, such as crossed gratings, and/or use different gratings for in-coupling and expansion. Many prior solutions, however, are susceptible to fabrication errors or unsatisfactory brightness or color uniformity.

What is needed is a more robust architecture for small, lightweight and cost effective solutions that provide a larger field of view in augmented-reality displays. A key component in accomplishing that goal is an exit pupil expander that provides improved brightness and color uniformity.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The invention is directed to a device for use in an augmented-reality display. The device can include a substrate of optical material having a first surface and an opposing second surface. The device can also include a first diffractive optical element having a first plurality of grating lines disposed on the first surface and defining a first region of the first diffractive optical element, the first plurality of grating lines being oriented in a first direction and having a first grating period. The device can also have a second plurality of grating lines disposed on the second surface of the substrate and defining a second region of the first diffractive optical element, the second region being adjacent to the first region, the second plurality of grating lines being oriented in a second direction and having a second grating period. A portion of the first grating lines can overlap a portion of the second grating lines defining a third region of the first diffractive optical element and forming an in-coupling area configured to receive a beam of incoming light. The device can also have a second diffractive optical element positioned adjacent the first diffractive optical element, the second diffractive optical element having a third plurality of grating lines disposed on the first or the second surface of the substrate, the third plurality of grating lines being oriented in a third direction and having a third grating period. The first diffractive optical element can be configured to expand at least part of the received light beam by odd-order diffraction expansion in the first and second regions and to expand at least part of the received light beam by even-order diffraction expansion in the third region, and to couple the expanded light components to the second diffractive optical element. Finally, the second diffractive optical element is configured to couple at least part of the coupled, expanded diffracted light components to exit the substrate by diffraction in the second diffractive optical element.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
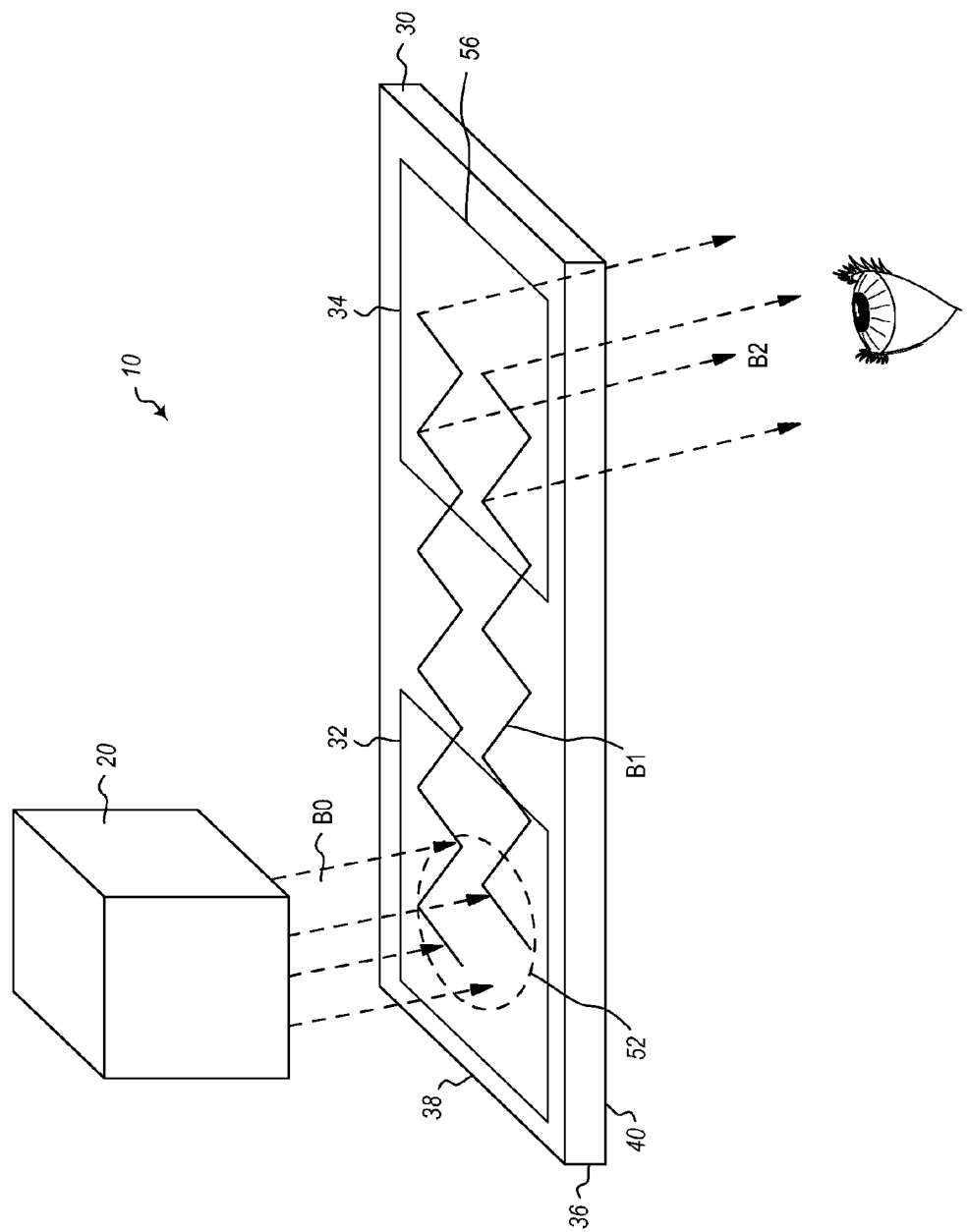
FIG. 1 is a schematic representation of one embodiment of a virtual display device.
Figure 2:
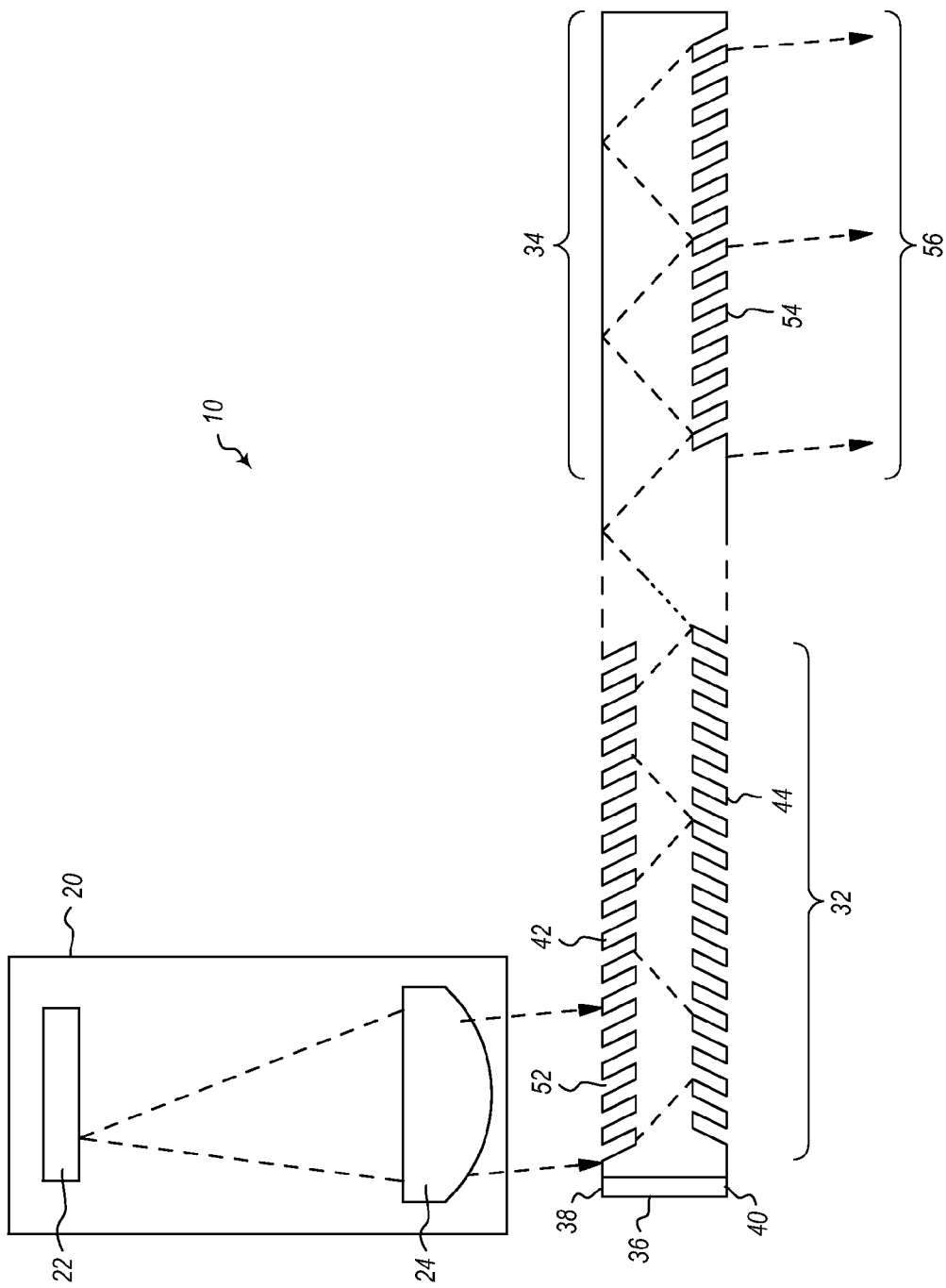
FIG. 2 is a partial cross section of FIG. 1.

Referring to FIGS. 1 and 2, a virtual display device 10 may comprise an optical engine 20 and a diffractive beam expander 30. The optical engine 20 can comprise a micro-display 22 and imaging optics 24. The imaging optics 24 convert a real image formed by the micro-display into a virtual image, which is observable through a viewing aperture 56 of the diffractive beam expander 30.

The optical engine 20 may comprise a micro-display 22 and imaging optics 24. The micro-display 22 may be a liquid crystal display, an array of micromechanically movable mirrors, an array of light emitting diodes or any other suitable display device. The imaging optics 24 may comprise one or more optical elements, such as lenses, mirrors, prisms or diffractive elements. Light rays transmitted from a point of the micro-display 22 are substantially collimated by the imaging optics 24 to form parallel rays of light which constitute the beam B0 provided by the optical engine 20. The distance between the micro-display 22 and the imaging optics 24 is set such that the pixels of the micro-display 22 are substantially at the focal distance of the imaging optics 24. A plurality of beams B0 are provided in order to display a virtual image, which consists of a plurality of pixels.

At least one beam B0 transmitted from an output aperture of the optical engine 20 impinges on an input aperture of diffractive beam expander 30. Light of the input beam B0 is coupled into a waveguiding substrate of diffractive beam expander 30. As discussed in more detail below, the in-coupled light B1 propagates within the substrate and interacts with gratings at two or more locations within the substrate to expand the beam in two dimensions, and an output grating diffracts an expanded output beam B2 towards the eye of an observer.

The enlarged light beams B2 provided by the diffractive beam expander 30 provide for a viewer an impression of a virtual image displayed at an infinite distance from the viewer. As a phenomenon, human viewers typically perceive that the displayed virtual image is only a few meters away from them, despite the infinite distance.

Figure 3:
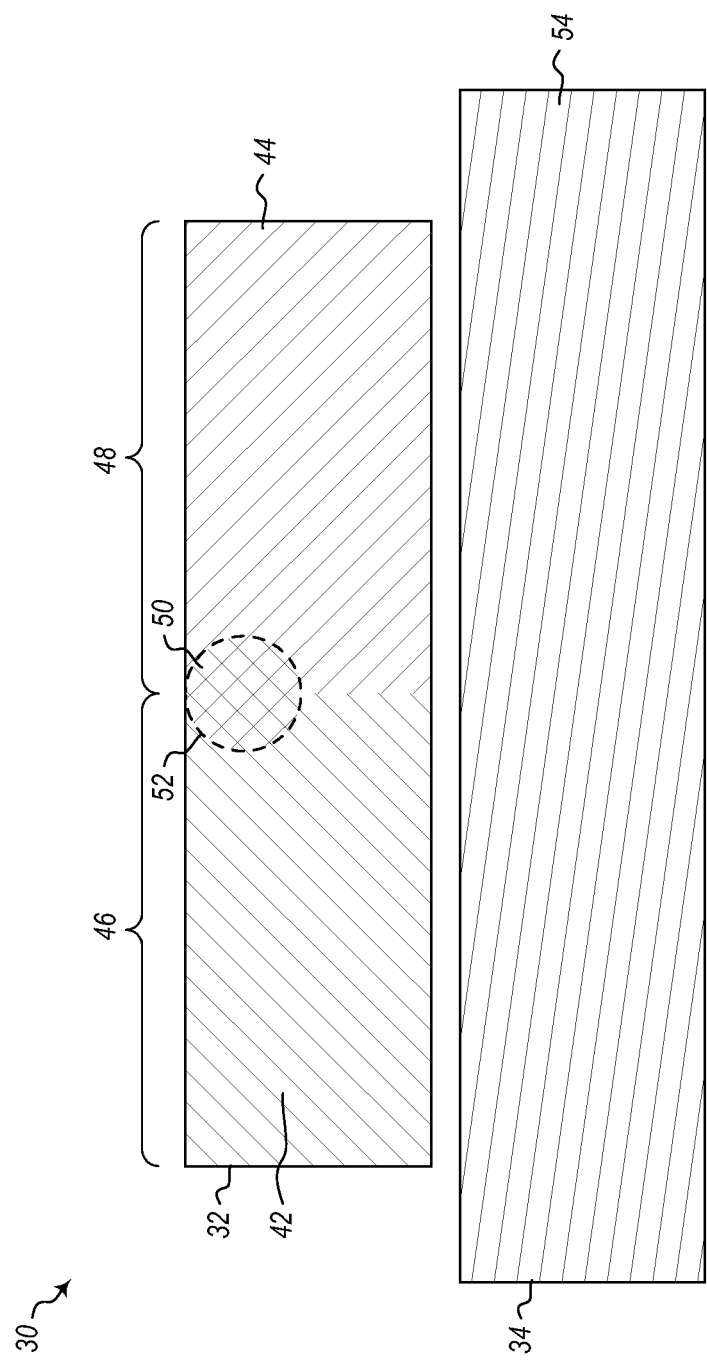
FIGS. 3 and 4 are schematic representations of one embodiment of a diffractive beam expander.

Referring to FIGS. 2 and 3, the diffractive beam expander 30 can include a first diffractive optical element 32 and a second diffractive optical element 34 formed on a substantially planar transparent substrate 36. Substrate 36 has a first substantially planar surface 38, and a second substantially planar surface 40, which is substantially parallel to said first planar surface 38. Substrate 36 is waveguiding, which means that in-coupled light may propagate within substrate 36 such that said propagating light may be confined within substrate 36 by total internal reflections (TIR).

The optical engine 20 provides an input beam B0. The input beam B0 impinging on the first diffractive optical element 32 may be coupled into the substrate 36 such that a corresponding in-coupled beam B1 propagates within said substrate towards the second diffractive optical element 34 by TIR.

The first diffractive optical element 32 is designed to satisfy two basic requirements. The first is to in-couple only first-order diffractions into the waveguide. The second is to satisfy the conditions necessary to achieve TIR within the waveguide. In one embodiment, first diffractive optical element 32 can have a first diffractive grating 42 formed on one of the planar surfaces 38 or 40 of substrate 36, and a second diffractive grating 44 formed on the other planar surface 38 or 40 opposite 42 first diffractive grating. First diffractive grating 42 can have a first grating direction and a first grating period, and second diffractive grating 44 can have a second grating direction and a second grating period.

As schematically illustrated in FIG. 3, first diffractive grating 42 defines a first region 46 corresponding to an area of substrate 36 covered by first diffractive grating 42 only (and where there is no overlap between first diffractive grating 42 and second diffractive grating 44). Similarly, second diffractive grating 44 defines a second region 48 corresponding to an area of substrate 36 covered by second diffractive grating 44 only (and where there is no overlap between first diffractive grating 42 and second diffractive grating 44). A third region 50 is defined by an area of substrate 36 where first diffractive grating 42 and second diffractive grating 44 overlap one another. In one embodiment, the size and shape of third region 50 is selected to substantially correspond to the size and shape of incoming beam B0 produced by optical engine 20 at the input surface of diffractive beam expander 30. This also defines an input aperture 52 for diffractive beam expander 30.

Figure 4:
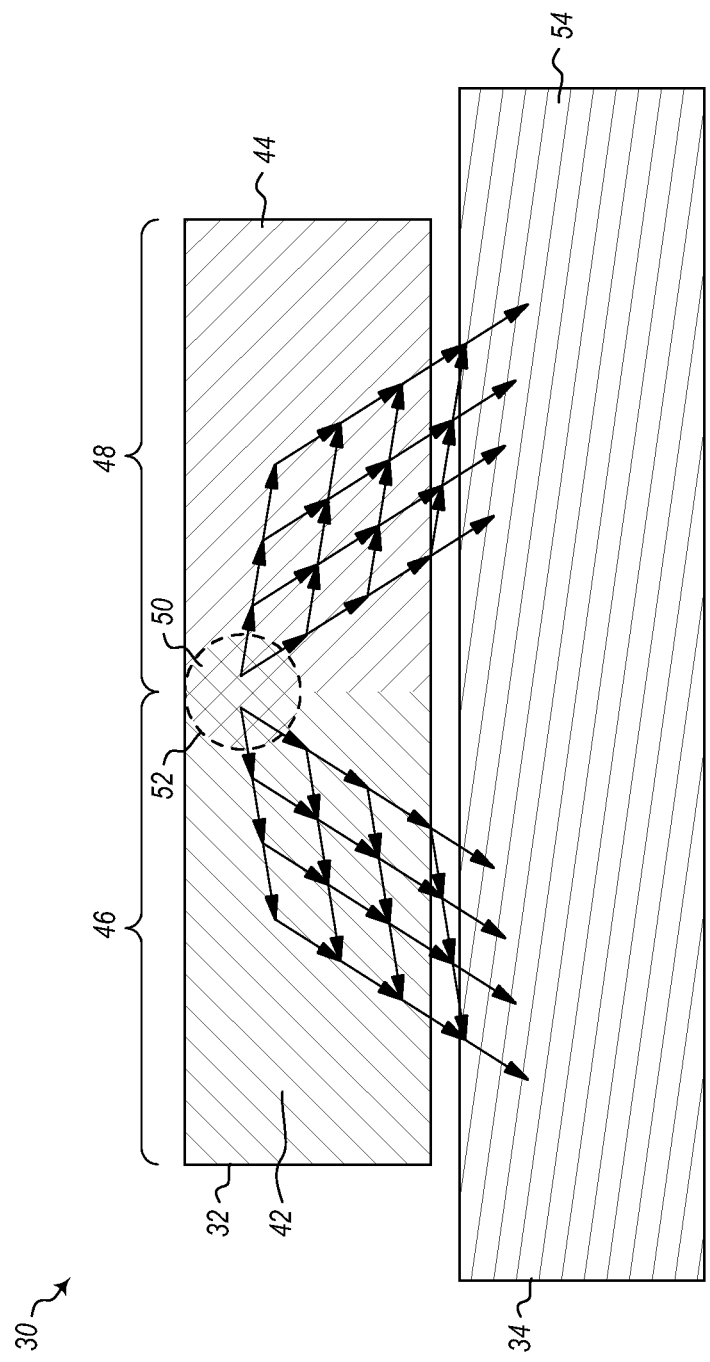

Third region 50 forms an in-coupling region for diffractive beam expander 30. The incident or incoming beam B0 enters the diffractive beam expander 30 in third region 50, and first diffractive optical element 32 in-couples into the waveguide only first-order diffractions of the incoming beam B0. Incoming light diffracted by first diffractive grating 42 and not diffracted by second diffractive grating 44 (i.e., zero reflected order of second diffractive grating 44) is directed into first region 46, where it undergoes odd-order expansion before reaching second diffractive optical element 34 (as schematically illustrated in FIG. 4). Conversely, incoming light not diffracted by first diffractive grating 42 (i.e., zero transmitted order of first diffractive grating 42) but diffracted by second diffractive grating 44 is directed into second region 48, where it also undergoes odd-order expansion before reaching second diffractive optical element 34 (as also schematically illustrated in FIG. 4). Finally, in-coupled light diffracted by both first diffractive grating 42 and second diffractive grating 44 is directed downwards into the boundary region between first and second diffractive gratings 42 and 44 and undergoes even-order expansion before reaching second diffractive optical element 34. By virtue of the interactions with the diffractive gratings contained within first diffractive optical element 32, first diffractive optical element 32 expands the in-coupled beam B1 in the horizontal direction. It should be also understood that the type of expansion performed by the various regions could also be reversed, so long as the total expansion within regions 46, 48 and 50 results in odd-order expansion overall. In other words, first and second regions 46 and 48 could just as easily be designed to perform even-order expansion, while the boundary region could be designed to perform odd-order expansion thereby resulting in odd-order expansion overall.

Second diffractive optical element 34 has a third diffractive grating 54 having a third grating direction and a third grating period. Light coupled into second diffractive optical element 34 from first diffractive optical element 32 is then expanded in the vertical direction and is out-coupled to exit substrate 36 through viewing aperture 56. Those skilled in the art will appreciate that the teachings set forth herein can be readily adapted to provide a diffractive beam expander 30 having only one output grating 54 (e.g., monocular) or having two output gratings 54 (e.g., stereoscopic).

It should be understood that the representations of the various elements set forth in FIGS. 1-4 are merely schematic representations, do not necessarily reflect the actual shape or dimensions for a particular application of the principles set forth herein, and are schematically represented to illustrate the principles set forth herein. As mentioned above, the specific grating directions and grating periods for each of gratings 42, 44 and 54 are interdependent and should preferably be selected based on the following factors: the specific geometries of the virtual display device; to in-couple only first-order diffractions into the diffractive beam expander; and to satisfy the conditions required for TIR within the waveguide. Particularly important to the first factor, it is also important to provide flexibility in allowing for tilting of the waveguide plate to accommodate and/or compensate for certain human factors (e.g., skull shape, IPD range, etc.). Tilting the waveguide plate has also been found to be useful in reducing "ghost images" or "rainbows."

The specific grating directions and grating period for gratings 42, 44 and 54 are determined based on the size and shape of the various components taking up display device 10, including the size and shape of the incoming light beam, the size and shape of substrate 36, and the size, shape and configuration of viewing aperture 56 and its orientation and spacing from a user's eyes. In practice, it is fairly common to begin with grating 54 to select an appropriate grating direction and grating period necessary to effectively couple the expanded, output beam having the desired properties in terms of field of view, etc. The size and shape of the out-coupling of diffractive optical element 54 is typically defined by the field of view and the IPD range of the human anatomy. The grating direction and period also depends on the paths by which the transmitted light propagates through the waveguide 36. Once the properties of grating 54 are selected, then it is possible to determine the direction and period of grating 42 needed to steer light into first region 46 and to achieve odd-order expansion. Similarly, the direction and period properties of grating 44 for steering light into second region 48 and for performing odd-order expansion can also be calculated.

The theory and calculations necessary to determine the specific grating directions and grating periods for each of gratings 42, 44 and 54 for a particular application may be derived based on well-known diffraction equations. If the coordinate system is chosen such that the grating grooves are parallel to the xy coordinate plane, the grating equation for linear gratings can be expressed in the form of coupled equation pair:

$$k_{x,m} = k_{x,in} + m 2\pi \cos(\phi)/d$$

$$k_{y,m} = k_{y,in} + m 2\pi \sin(\phi)/d$$

where $k_{x,m}$ and $k_{y,m}$ denote the x and y components, respectively, of the wave vector of integer diffraction order m, $k_{x,in}$ and $k_{y,in}$ are the x and y components, respectively, of the wave vector of the incoming wave, d is the grating period, and $\phi$ is the orientation of the grating vector, i.e., direction of modulation, with respect to the x direction in the xy plane.

The architecture discussed herein provides at least the following advantages over the prior art. Because first diffractive optical element 32 uses the same gratings to provide both even and odd order expansion, the energy between the two types of expansion is automatically balanced, which leads to better brightness and color uniformity in the output beam. The use of two linear gratings (formed on opposite sides of the substrate with an area of overlap to form the in-coupling region) make the device easier to fabricate and less susceptible to fabrication errors. In-coupling efficiency is increased by using two linear slanted gratings for in-coupling. Flexible tilting of the waveguide plate is allowed, which gives greater freedom to take into account various human factors (skull shape, IPD range, etc.). Very large FOVs are allowed. If high-refractive index materials (such as 1.9) are used, 90+ diagonal FOV is easily obtained with standard aspect ratios like 4:3 or 16:9.

The gratings 42, 44 and 54 are diffractive elements. The gratings 42, 44 and 54 may be surface relief gratings implemented by molding or embossing or index-modulated gratings. The gratings 42, 44 and 54 can also be polarization gratings made of birefringent material. The profile of the gratings 42, 44 and 54 may be e.g., sinusoidal, binary rectangular, or blazed. Yet, the profile of the gratings 42, 44 and 54 may be binary slanted or sinusoidal slanted. One or more gratings 42, 44 and 54 may be embedded in the substrate 36. The diffractive beam expander 30 may also comprise more than three diffractive elements 42, 44 and 54. The input gratings 42, 44 and the output grating 54 may be slanted or blazed surface relief gratings in order to maximize the efficiency of coupling light into and out of substrate 36. The diffractive beam expander 30 may comprise one or more optically absorbing structures to eliminate stray light. In general, slanted gratings are preferred because they enable more light to be steered to the plus one diffraction order than to the minus one diffraction order, which provides greater efficiency.

The following example is intended to further illustrate the principles discussed above. This example provides a representative diffractive beam expander 30 having a very-large field of view (i.e., 90 degrees diagonal) in material with a refractive index of 1.9, which is intended for use in a virtual display device 10 designed to be worn on the head of a human user with a viewing aperture 56 positioned proximate one or both of the user's eyes. Within that context, the thickness of substrate 36 can generally be in a range of about 0.5 to about 2 millimeters, the substrate can be in the range of about 3 to 10 centimeters in length and width. First diffractive optical element 32 can be in the range of about 1 to about 5 millimeters in length and width. Second diffractive optical element 34 can have a width from about 10 to about 100 millimeters and length from about 10 to about 70 millimeters and length. First diffractive grating 42 can be formed on first planar surface 38 and can be about 1 to about 5 millimeters in length and width. Similarly, second diffractive grating 44 can be formed on second planar surface 40 and can be from about 1 to about 5 millimeters in length and width. Most of second diffractive grating 44 is offset from and positioned adjacent to first diffractive grating 42, except for an area of overlap between the two gratings forming input aperture 52, which constitutes region 50 that forms in-coupling region 50 for receiving the incoming light beam and in-coupling the beam into the diffractive beam expander 30. The size and shape of in-coupling region 50 are preferably matched to the size and shape of the incident incoming light beam to maximize in-coupling efficiency. For example, the in-coupling region 50 can be circular, elliptical or rectangular, hi the case of a circular-shaped input aperture, input aperture 52 can typically be in the range of about 1 to about 5 millimeters in diameter. Similarly, in the case of a rectangular-shaped input aperture, input aperture 52 can typically be in the range of about 1 to about 7 millimeters diagonally.

In this example, first diffractive grating 42 is a slanted surface relief grating formed on first planar surface 38, with a grating direction oriented at an angle of about −50 degrees and a grating period of about 250 nanometers. Second diffractive grating 44 is also a slanted surface relief grating formed on second planar surface 40, with a grating direction oriented at an angle of about 65 degrees and a grating period of about 320 nanometers.

Third diffractive grating 54, which also defines the viewing aperture 56, can be formed on either first planar surface 38 or second planar surface 40, with dimensions of about 5 to about 8 centimeters in width and about 3 to about 6 centimeters in length. Third diffractive grating 42 is also a slanted surface relief grating, with a grating direction oriented at an angle of about −5 degrees and a grating period of about 260 nanometers. First, second and third diffractive gratings 42, 44 and 54 could also be index-modulated gratings or polarization gratings.

Figure 5:
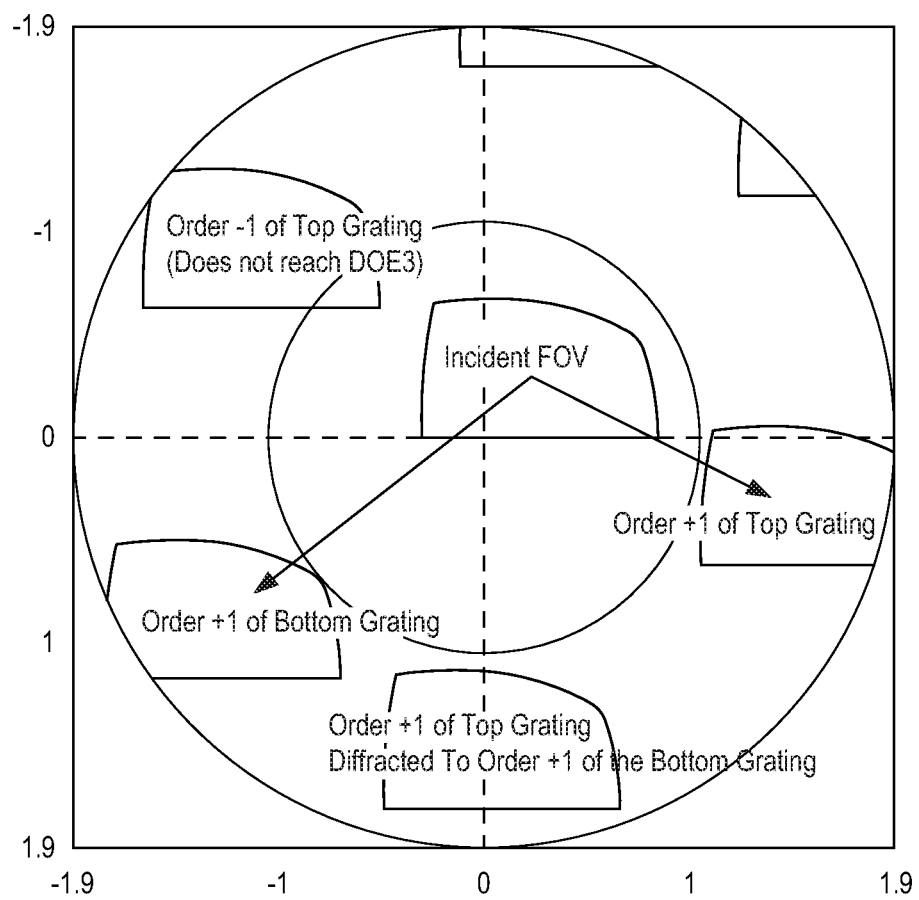
FIG. 5 is a k-vector diagram for the diffractive beam expander of FIGS. 3 and 4.

FIG. 5 illustrates a k-vector diagram for the foregoing representative example.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
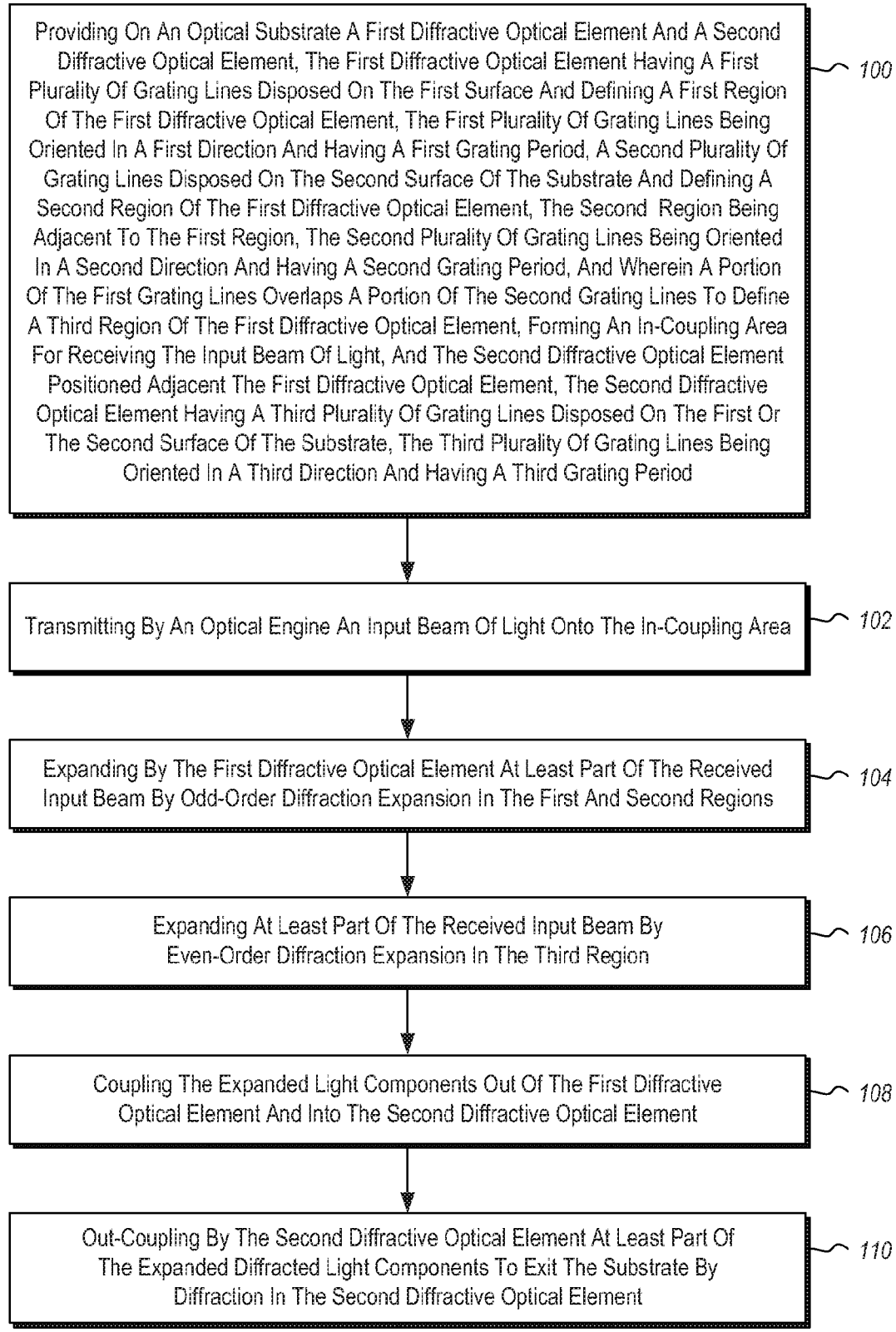
FIG. 6 is a flow diagram illustrating one embodiment of a method for diffractive beam expansion.

This application is also directed to methods for diffractive beam expansion. Referring to FIG. 6, one such method may include the following acts. The method begins at act 100 by providing on an optical substrate a first diffractive optical element and a second diffractive optical element, the first diffractive optical element having a first plurality of grating lines disposed on the first surface and defining a first region of the first diffractive optical element, the first plurality of grating lines being oriented in a first direction and having a first grating period, a second plurality of grating lines disposed on the second surface of the substrate and defining a second region of the first diffractive optical element, the second region being adjacent to the first region, the second plurality of grating lines being oriented in a second direction and having a second grating period, and wherein a portion of the first grating lines overlaps a portion of the second grating lines to define a third region of the first diffractive optical element, forming an in-coupling area for receiving the input beam of light, and the second diffractive optical element positioned adjacent the first diffractive optical element, the second diffractive optical element having a third plurality of grating lines disposed on the first or the second surface of the substrate, the third plurality of grating lines being oriented in a third direction and having a third grating period. At step 102, the method continues with an act for transmitting by an optical engine an input beam of light onto the in-coupling area. As indicated at step 104, the method can also include expanding by the first diffractive optical element at least part of the received input beam by odd-order diffraction expansion in the first and second regions. In addition, at step 106, the method can include expanding at least part of the received input beam by even-order diffraction expansion in the third region. Then, at step 108 an act of coupling the expanded light components out of the first diffractive optical element and into the second diffractive optical element. Finally, as indicated at 110, out-coupling by the second diffractive optical element at least part of the expanded diffracted light components to exit the substrate by diffraction in the second diffractive optical element.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical device comprising:
a substrate of optical material having a first surface and an opposing second surface;
a first diffractive optical element having a first diffractive grating disposed on the first surface and defining a first region, having a second diffractive grating disposed on the second surface defining a second region adjacent to the first region, and wherein a limited portion of the first diffractive grating overlaps a corresponding limited portion of the second diffractive grating to define a third region of the first diffractive optical element where the first region and the second region overlap, forming an in-coupling area configured to receive a beam of incoming light, the first diffractive optical element configured to direct a first portion of the beam of incoming light to the first region, which does not overlap with the second region, for diffraction by the first diffractive grating and direct a second portion of the beam of incoming light to the second region, which does not overlap with the first region, for diffraction by the second diffractive grating to expand the beam of incoming light in a first direction; and
a second diffractive optical element positioned adjacent the first diffractive optical element, the second diffractive optical element having a third diffractive grating on the first or the second surface of the substrate, the second diffractive optical element configured to expand the beam of incoming light in a second direction essentially perpendicular to the first direction.

2. The optical device of claim 1, wherein the first diffractive optical element is configured to expand at least part of the received light beam by odd-order diffraction expansion in the first and second regions.

3. The optical device of claim 2, wherein the first diffractive optical element is configured to expand at least part of the received light beam by even-order diffraction expansion in the third region.

4. The optical device of claim 1, wherein the first diffractive optical element is configured to expand at least part of the received light beam by even-order diffraction expansion in the first and second regions.

5. The optical device of claim 2, wherein the first diffractive optical element is configured to expand at least part of the received light beam by odd-order diffraction expansion in the third region.

6. The optical device of claim 3, wherein the first diffractive optical element is configured to couple the expanded light components to the second diffractive optical element.

7. The optical device of claim 4, wherein the second diffractive optical element is configured to couple at least part of the coupled, expanded diffracted light components to exit the substrate by diffraction in the second diffractive optical element.

8. The optical device of claim 1, wherein first diffractive grating comprises a first plurality of grating lines disposed on the first surface, the first plurality of grating lines being oriented in a first direction and having a first grating period.

9. The optical device of claim 8, wherein second diffractive grating comprises a second plurality of grating lines disposed on the second surface, the second plurality of grating lines being oriented in a second direction and having a second grating period.

10. The optical device of claim 9, wherein third diffractive grating comprises a third plurality of grating lines being oriented in a third direction and having a third grating period.

11. The optical device of claim 10, wherein the third diffractive grating is disposed on the first surface.

12. The optical device of claim 10, wherein the third diffractive grating is disposed on the second surface.

13. The optical device of claim 10, wherein one or more of the first diffractive grating, the second diffractive grating and the third diffractive grating is a slanted, surface relief grating.

14. The optical device of claim 10, wherein one or more of the first diffractive grating, the second diffractive grating and the third diffractive grating is an index-modulated grating.

15. The optical device of claim 10, wherein one or more of the first diffractive grating, the second diffractive grating and the third diffractive grating comprise polarization gratings made of birefringent material.

16. The optical device of claim 1, wherein the size and shape of the third region is substantially the same size and shape as the beam of incoming light.

17. The optical device of claim 1 further comprising an optical engine for generating and projecting the beam of incoming light onto the in-coupling area of the optical substrate.

18. The optical device of claim 1, wherein the third diffractive element defines a viewing aperture for viewing an expanded beam of light out-coupled from the second diffractive optical element.

* * * * *